US012594742B2

(12) United States Patent
Sekiguchi et al.

(10) Patent No.: US 12,594,742 B2
(45) Date of Patent: Apr. 7, 2026

(54) METAL-RESIN COMPOSITE AND METHOD AND APPARATUS FOR MANUFACTURING THE SAME

(71) Applicant: KOBE STEEL, LTD., Hyogo (JP)

(72) Inventors: Shu Sekiguchi, Kobe (JP); Kenichi Watanabe, Kobe (JP); Hiroko Kashima, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 18/322,223

(22) Filed: May 23, 2023

(65) Prior Publication Data

US 2024/0001642 A1     Jan. 4, 2024

(30) Foreign Application Priority Data

Jul. 1, 2022     (JP) ................................. 2022-107232

(51) Int. Cl.
| | |
|---|---|
| *B32B 3/26* | (2006.01) |
| *B32B 3/30* | (2006.01) |
| *B32B 15/08* | (2006.01) |
| *B32B 38/00* | (2006.01) |

(52) U.S. Cl.
CPC .............. *B32B 15/08* (2013.01); *B32B 3/266* (2013.01); *B32B 3/30* (2013.01); *B32B 38/0004* (2013.01)

(58) Field of Classification Search
None
See application file for complete search history.

(56) References Cited

U.S. PATENT DOCUMENTS

| | | | |
|---|---|---|---|
| 4,234,638 A | | 11/1980 | Yamazoe et al. |
| 4,728,557 A | * | 3/1988 | Asano ............... B29C 45/14344 |
| | | | 428/140 |
| 4,956,139 A | | 9/1990 | Koizumi et al. |
| 5,672,405 A | * | 9/1997 | Plank, Jr. ................ B29C 70/78 |
| | | | 428/140 |
| 2009/0117401 A1 | * | 5/2009 | Naritomi ................. B29C 45/27 |
| | | | 428/545 |
| 2016/0016359 A1 | | 1/2016 | Kondo et al. |
| 2021/0017646 A1 | | 1/2021 | Miura |

FOREIGN PATENT DOCUMENTS

| | | | |
|---|---|---|---|
| DE | 69910508 T2 | 6/2004 | |
| FR | 2240808 A | * 4/1975 | ......... B29C 37/0085 |
| JP | S58-196115 U | 12/1983 | |
| JP | S61-248711 A | 11/1986 | |
| JP | S63-064708 A | 3/1988 | |
| JP | S63-202431 A | 8/1988 | |
| JP | 2011011506 A | * 1/2011 | |
| JP | 2016-087924 A | 5/2016 | |
| JP | 2016-097531 A | 5/2016 | |
| WO | 2014/142189 A1 | 9/2014 | |

OTHER PUBLICATIONS

Machine translation of Abstract for FR2240808 (Year: 2024).*
Machine translation of DE69910508 (Year: 2024).*
JP 201111506_translation (Year:2011).*

* cited by examiner

*Primary Examiner* — Travis M Figg
(74) *Attorney, Agent, or Firm* — Studebaker Brackett PLLC

(57) ABSTRACT

A metal-resin composite includes: a metal plate including at least one cut-and-raised portion including a cutout hole and a cut-and-raised piece; and a resin material disposed only on one surface side of the metal plate, the resin material cured by burying the cut-and-raised portion, the resin material integrated with the metal plate.

11 Claims, 9 Drawing Sheets

METAL-RESIN COMPOSITE AND METHOD AND APPARATUS FOR MANUFACTURING THE SAME

CROSS-REFERENCE TO RELATED APPLICATIONS

This application claims priority of Japanese Patent Application No. 2022-107232 filed on Jul. 1, 2022, the contents of which are incorporated herein by reference.

TECHNICAL FIELD

The present invention relates to a metal-resin composite and a method and an apparatus for manufacturing the same.

BACKGROUND ART

A method for manufacturing a metal-resin composite by press-molding a metal plate and a thermosetting resin material is known (for example, WO2014/142189, JP 2016-97531 A, and JP 2016-87924 A).

In the metal-resin composite, it is necessary to join the metal plate and the resin material with high joint strength. In Patent Literature 1 to 3, the metal plate and the resin material are integrated by providing a through hole in a metal plate, causing a resin material to flow into the through hole, sandwiching the metal plate between the resin materials, and thermally curing the resin material. Accordingly, high joint strength between the metal plate and the resin material is secured.

SUMMARY OF INVENTION

When the metal plate is sandwiched between the resin materials, the thickness of the metal plate decreases due to the restriction of the cross-sectional dimension, and the rigidity of the metal-resin composite may decrease. In addition, when the resin material adheres to both surfaces of the metal plate, the structure may become complicated from the viewpoint of joining with other members, required dimensional accuracy, and the like, and handling may not be easy and versatility may be lacking.

An object of the present invention is to achieve both high joint strength and high rigidity with a simple structure in a metal-resin composite and a method and an apparatus for manufacturing the same.

A first aspect of the present invention provides a metal-resin composite including: a metal plate including at least one cut-and-raised portion including a cutout hole and a cut-and-raised piece; and a resin material disposed only on one surface side of the metal plate, the resin material cured by burying the cut-and-raised portion, the resin material integrated with the metal plate.

According to this configuration, since the at least one cut-and-raised portion is buried in the resin material, the resin material is less likely to be peeled off from the metal plate, and high joint strength regarding integration can be secured. In addition, since the resin material is disposed on only one surface side of the metal plate, the number of layers of the resin material can be reduced from two to one as compared with the case where the resin material is disposed on both surface sides. Therefore, not only the structure can be simplified, but also the thickness of the resin material can be reduced. Therefore, the thickness of the metal plate can be prevented from becoming small due to the restriction of the cross-sectional dimension, and high rigidity of the metal-resin composite can be secured. Therefore, in the metal-resin composite, it is possible to achieve both high joint strength and high rigidity of the metal-resin composite with a simple structure. Here, "the resin material is disposed only on one surface side of the metal plate" means that the resin material is disposed on one surface of the metal plate and inside the cutout hole, and is not disposed on the other surface. It should be noted that since it may be difficult for the resin material not to leak onto the other surface at all in actual molding, it is allowable that the resin material is slightly (for example, about several tens to several hundreds of μm in thickness) disposed on the other surface to an extent not related to the joint strength.

The cut-and-raised piece may be configured by the edge portion of the cutout hole being raised by burring.

According to this configuration, the cut-and-raised piece can be formed by burring that is very simple as machining.

The cut-and-raised piece may have a tapered shape.

According to this configuration, since the cut-and-raised piece has a tapered shape, the resin material entering the tapered shape is less likely to come off, and higher joint strength can be exhibited.

The cutout hole may have a polygonal shape or an elliptic shape.

According to this configuration, it is possible to prevent the resin material from rotating on one surface of the metal plate and peeling off from the metal plate.

The cutout hole may have a polygonal shape, and the cut-and-raised piece may have a polygonal shape having a shape complementary to a shape of the cutout hole, and may have a base end connected to one side of an edge portion of the cutout hole and a distal end being a free end opposite to the base end.

According to this configuration, a strong drag is exerted against the shearing force in the direction from the distal end to the base end of the cut-and-raised piece in order that the resin material does not come off. Therefore, the joint strength against the shearing force in the direction can be selectively increased. In addition, since the cutout hole and the cut-and-raised piece have complementary shapes, the at least one cut-and-raised portion can be formed only by making a cut in the metal plate and raising the cut portion. Therefore, it is not necessary to completely cut the metal plate in forming the at least one cut-and-raised portion. Therefore, not only a cut end material does not come out, but also reduction in rigidity can be suppressed to a certain extent.

The cutout hole may have a polygonal shape having two opposing sides, and the cut-and-raised piece may have a polygonal shape having a shape complementary to a shape of the cutout hole, and may have two base ends connected to two opposing sides of an edge portion of the cutout hole, and a central portion raised from the two base ends.

According to this configuration, a tunnel structure is formed on one surface of the metal plate by the cut-and-raised piece. Therefore, the resin material entering the tunnel structure is less likely to come off, and higher joint strength can be exhibited.

The at least one cut-and-raised portion may include a plurality of cut-and-raised portions.

According to this configuration, since the plurality of cut-and-raised portions are buried in the resin material, higher joint strength can be secured. In addition, the resin material can be prevented from rotating on one surface of the metal plate.

The metal plate may have a hat shape in a cross section perpendicular to a longitudinal direction, and the at least one cut-and-raised portion may be provided on a flat surface of the metal plate.

According to this configuration, the hat-shaped metal plate is highly versatile and useful. In addition, since the at least one cut-and-raised portion is provided on the flat surface, the at least one cut-and-raised portion can be easily formed.

A second aspect of the present invention provides a method for manufacturing a metal-resin composite by press-molding a metal plate and a resin material, the method including: forming at least one cut-and-raised portion including a cutout hole and a cut-and-raised piece in the metal plate; disposing the resin material only on one surface side of the metal plate to bury the at least one cut-and-raised portion of the metal plate in the resin material in an uncured state; and integrating the metal plate and the resin material by sandwiching the metal plate and the resin material between an upper mold and a lower mold and curing the resin material.

A third aspect of the present invention provides an apparatus for manufacturing a metal-resin composite by press-molding a metal plate and a resin material, the apparatus including: a machining machine configured to form at least one cut-and-raised portion including a cutout hole and a cut-and-raised piece in the metal plate; and an upper mold and a lower mold configured to sandwich the metal plate and the resin material and cure the resin material, in a state in which the resin material is disposed only on one surface side of the metal plate, in such a way as to bury the at least one cut-and-raised portion of the metal plate in the resin material in an uncured state.

According to the present invention, it is possible to achieve both high joint strength and high rigidity with a simple structure in a metal-resin composite and a method and an apparatus for manufacturing the same.

DESCRIPTION OF EMBODIMENTS

Hereinafter, a metal-resin composite and a method and an apparatus for manufacturing the same will be described as embodiments of the present invention with reference to the accompanying drawings.

First Embodiment

Figure 1:
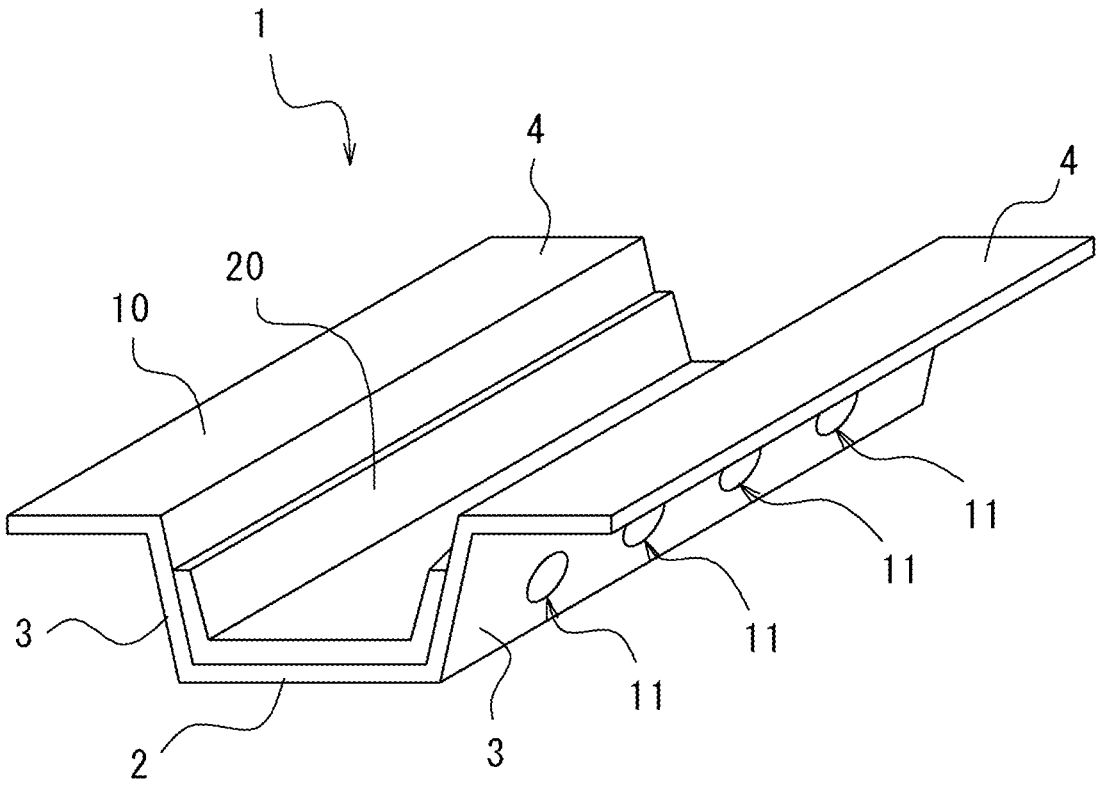
FIG. 1 is a perspective view of a metal-resin composite according to a first embodiment.
Figure 2:
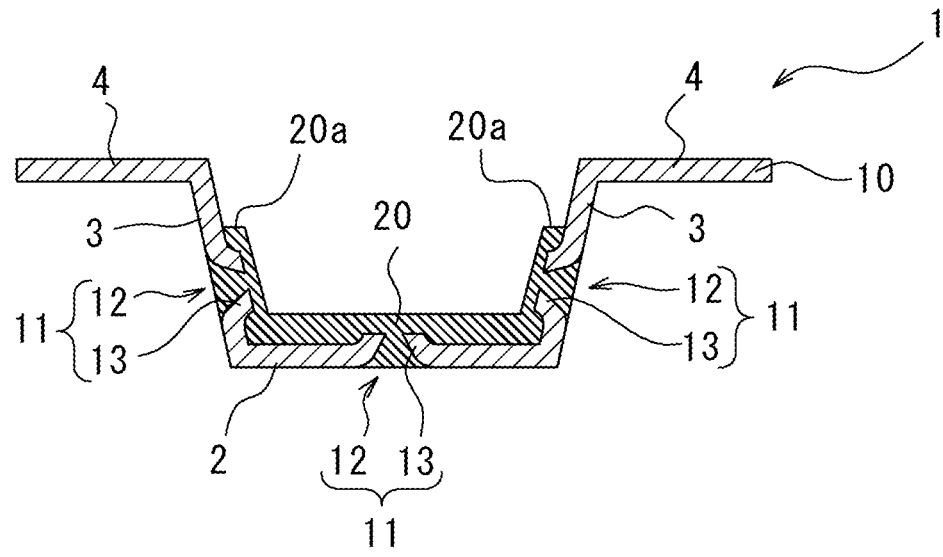
FIG. 2 is a cross-sectional view perpendicular to the longitudinal direction of the metal-resin composite.

Referring to FIGS. 1 and 2, a metal-resin composite 1 according to the first embodiment includes a metal plate 10 and a resin material 20. The metal-resin composite 1 has a hat shape in a cross section perpendicular to the longitudinal direction. Specifically, the metal-resin composite 1 is configured by fastening the resin material 20 only to one surface side (in the illustrated example, the upper surface side and the recessed-shaped inner surface side) of the metal plate 10 having a hat shape. However, the shape of the metal-resin composite 1 is not limited to a hat shape, and may be any shape.

The metal-resin composite 1 includes a bottom wall portion 2 extending in the horizontal direction, a side wall portion 3 rising from an end portion of the bottom wall portion 2, and a flange portion 4 extending outward in the horizontal direction from the side wall portion 3. The bottom wall portion 2 is made of a metal plate 10 and a resin material 20, the side wall portion 3 is made of a metal plate 10 and a resin material 20, and the flange portion 4 is made of only the metal plate 10. The resin material 20 terminates at the end surface 20a halfway through the side wall portion 3 from the bottom wall portion 2 toward the flange portion 4.

The metal plate 10 includes a cut-and-raised portion 11. The cut-and-raised portion 11 includes a cutout hole 12 and a cut-and-raised piece 13.

In the present embodiment, the cut-and-raised portion 11 is provided in each portion of the metal plate 10 constituting the bottom wall portion 2, the side wall portion 3, and the flange portion 4. A plurality of (four in the example in FIG. 1) cut-and-raised portions 11 are provided at equal intervals in the longitudinal direction on the flat surface of the metal plate 10 constituting the side wall portion 3. The same applies to the bottom wall portion 2 and the flange portion 4. However, the number and arrangement of the cut-and-raised portions 11 are not particularly limited.

In the present embodiment, the cut-and-raised piece 13 is configured by the edge portion of the cutout hole 12 being raised by burring. For example, the cutout hole 12 has a circular shape, and the cut-and-raised piece 13 has a conical shape.

In the present embodiment, the cut-and-raised piece 13 has a tapered shape toward the tip. Alternatively, the direction of the tapered shape may be opposite (what is called a trumpet shape). Furthermore, the shape of the cut-and-raised portion 11 is not limited to the illustrated example, and various other modifications are conceivable as described below.

Regarding the arrangement of the metal plate 10 and the resin material 20, specifically, the resin material 20 is arranged on one surface of the metal plate 10 and inside the cutout hole 12, and is not arranged on the lower surface. It should be noted that in actual molding, it may be difficult to prevent any leakage of the resin material 20 onto the lower surface. Therefore, the resin material 20 may be slightly (for example, about several tens to several hundreds of μm in thickness) disposed on the lower surface to the extent of not being related to the joint strength.

A method and an apparatus 50 for manufacturing a metal-resin composite 1 in the present embodiment will be described with reference to FIGS. 3 to 7. In the figures, a horizontal direction is represented as an X direction, and a vertical direction (up-down direction or height direction) is represented as a Y direction. In addition, the metal-resin composite 1 (the metal plate 10 and the resin material 20) is assigned with hatching to indicate a cross section, but hatching is omitted for other members for clarity of illustration.

In the present embodiment, two rounds of press molding, formation of the cutout hole 12, and burring are executed while steps 1 to 6 shown in FIGS. 3 to 7 are sequentially executed. Specifically, the first round of pressing is executed in the first and second steps shown in FIGS. 3 and 4, the cut-and-raise machining (burring) is executed in the third step shown in FIG. 5, and the second round of pressing is executed in the fourth to sixth steps shown in FIGS. 6 to 8.

In the present embodiment, the first and second rounds of pressing are respectively executed in different molds 90 and 100, but the first and second rounds of pressing may be executed in the same mold. In addition, the metal-resin composite 1 may be produced one by one, that is, the first round of pressing, the cut-and-raise machining (burring), and the second round of pressing may be continuously executed. Alternatively, after the molding of the required number of metal plates 10 (the first round of pressing) is repeatedly executed, the cut-and-raise machining (burring) may be performed on the required number of metal plates 10, and furthermore, thereafter, integral molding of the metal plates 10 and the resin material 20 (the second round of pressing) may be repeatedly executed. As will be described in detail below, since there is a time for installing the resin material 20 on the metal plate 10, the latter is preferable from the viewpoint of shortening the time.

The configuration of the apparatus 50 that executes the above series of steps (see FIGS. 3 to 8) will be described. The apparatus 50 includes molds 90 and 100, drive units 91 and 101 that respectively drive the molds 90 and 100, a heating unit 102 that heats the mold 100, and a machining machine 130 that performs cut-and-raise machining (including burring) on the metal plate 10. It should be noted that the drive units 91 and 101 and the heating unit 102 can be obtained using known units capable of executing press molding, are shown only in FIGS. 3 and 6 as a conceptual diagram without illustrating details, and illustration thereof is omitted in other figures.

6

Figure 3:
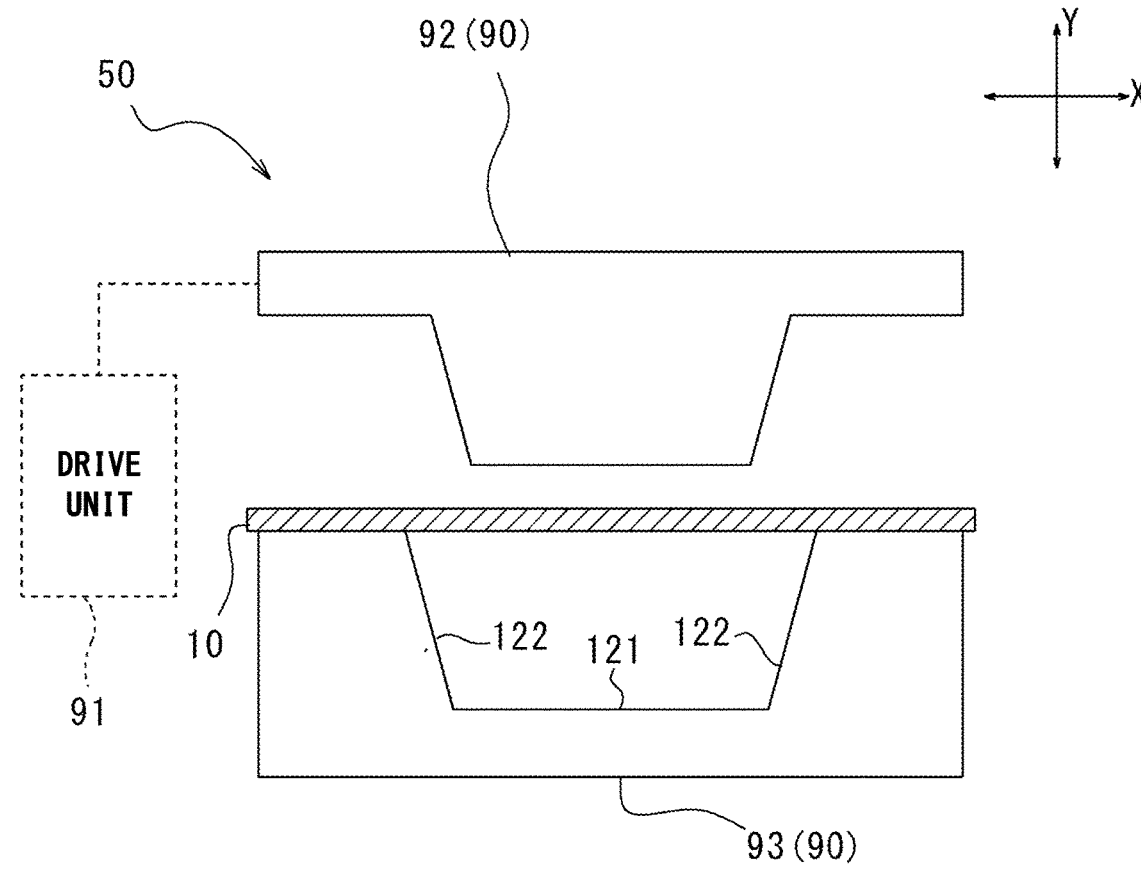
FIG. 3 is a cross-sectional view showing a first step of a method for manufacturing the metal-resin composite according to the first embodiment.
Figure 4:
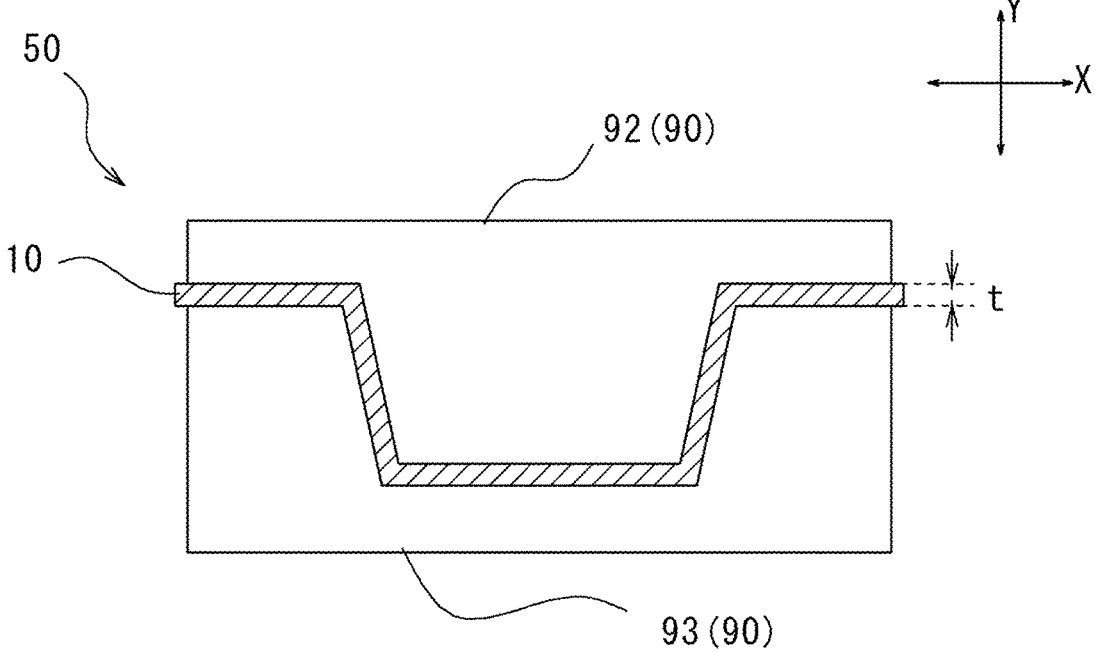
FIG. 4 is a cross-sectional view showing a second step of the method for manufacturing the metal-resin composite according to the first embodiment.

Referring to FIGS. 3 and 4, the mold 90 is used for the above first round of pressing. The mold 90 is for press-molding the flat plate-shaped metal plate 10 into a hat shape. The mold 90 includes an upper mold 92 and a lower mold 93 that sandwich the metal plate 10. In the present embodiment, the upper mold 92 is configured as a punch, and the lower mold 93 is configured as a die. The upper mold 92 is movable in the vertical direction by the drive unit 91, that is, is configured to be capable of approaching and separating from the lower mold 93. However, a drive mode of the mold 90 by the drive unit 91 is not particularly limited, and the drive unit 91 may move at least one of the upper mold 92 and the lower mold 93 in the vertical direction.

The upper mold 92 and the lower mold 93 have shapes complementary to the hat shape of the metal plate 10. The distance between the upper mold 92 and the lower mold 93 is, at any portion, equal to the thickness t of the metal plate 10.

Figure 5:
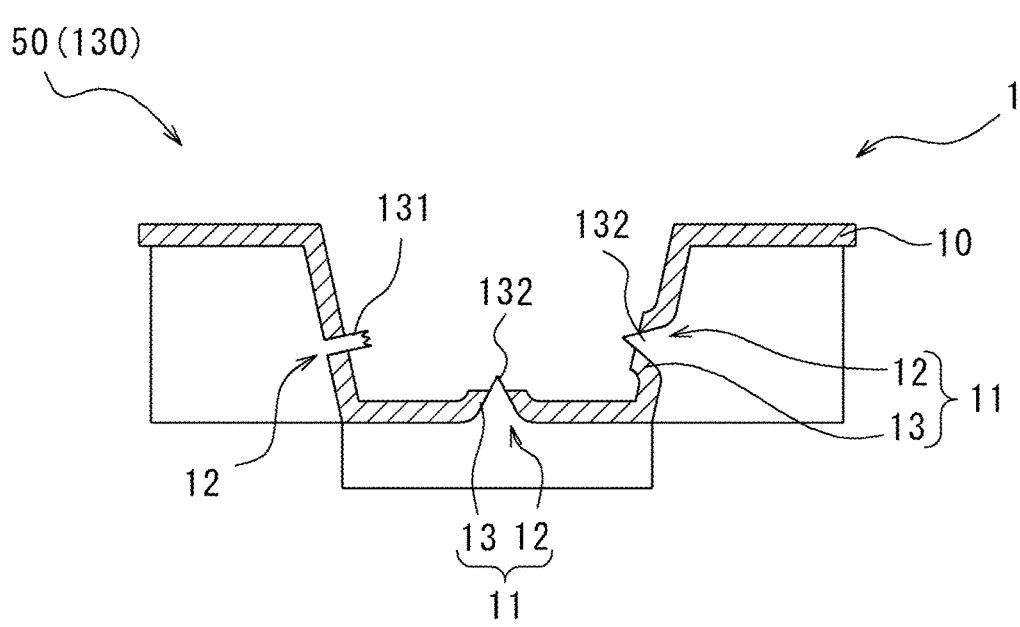
FIG. 5 is a cross-sectional view showing a third step of the method for manufacturing the metal-resin composite according to the first embodiment.

Referring to FIG. 5, the machining machine 130 is used for the cut-and-raise machining (including the burring). The machining machine 130 includes a hole forming machine 131 that forms a cutout hole 12 which is a through hole, and a raising machine 132 that raises an edge portion of the cutout hole 12 formed by the hole forming machine 131 to form a cut-and-raised piece 13. In the illustrated example, a state in which the hole forming machine 131 and the raising machine 132 are simultaneously used is shown, but in practice, machining by the raising machine 132 is performed after completion of the machining by the hole forming machine 131.

Figure 6:
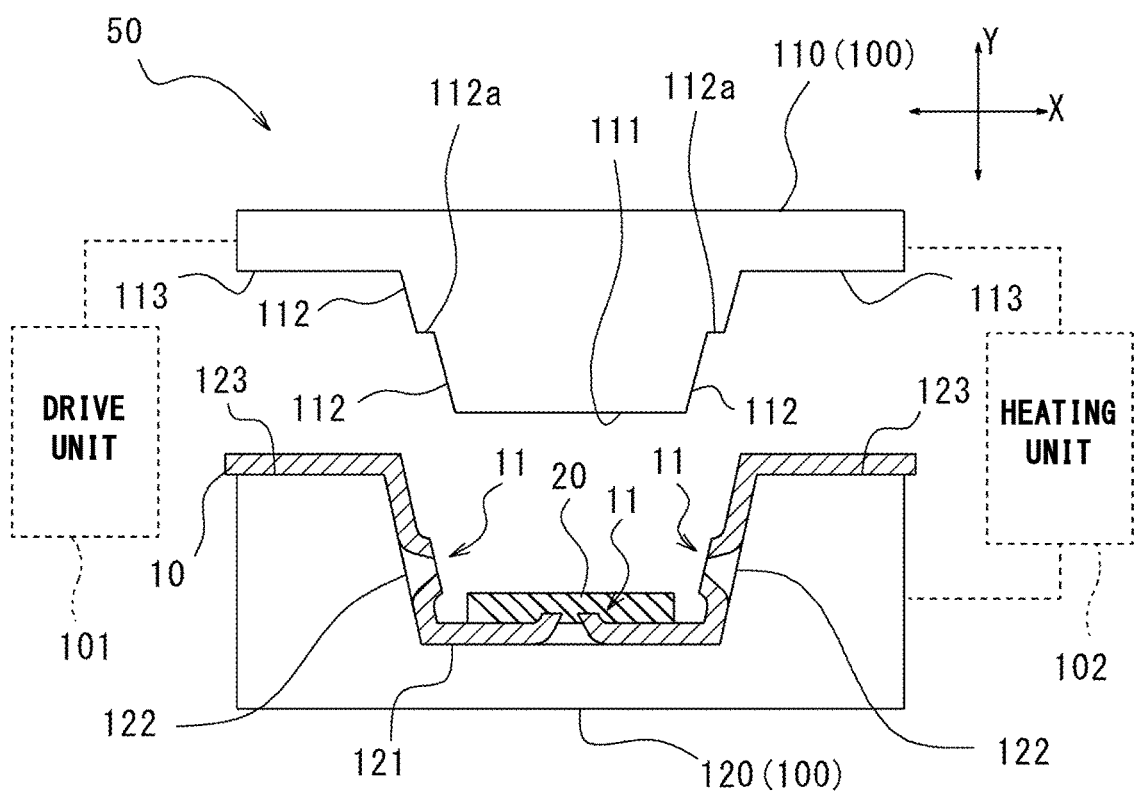
FIG. 6 is a cross-sectional view showing a fourth step of the method for manufacturing the metal-resin composite according to the first embodiment.
Figure 7:
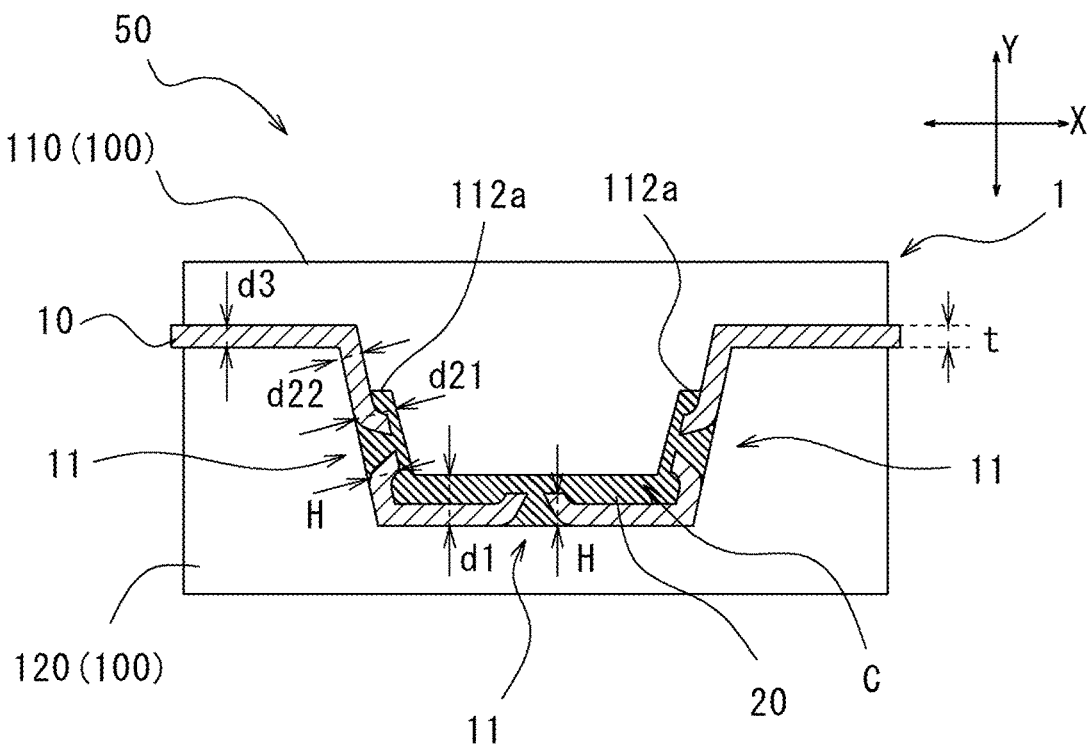
FIG. 7 is a cross-sectional view showing a fifth step of the method for manufacturing the metal-resin composite according to the first embodiment.
Figure 8:
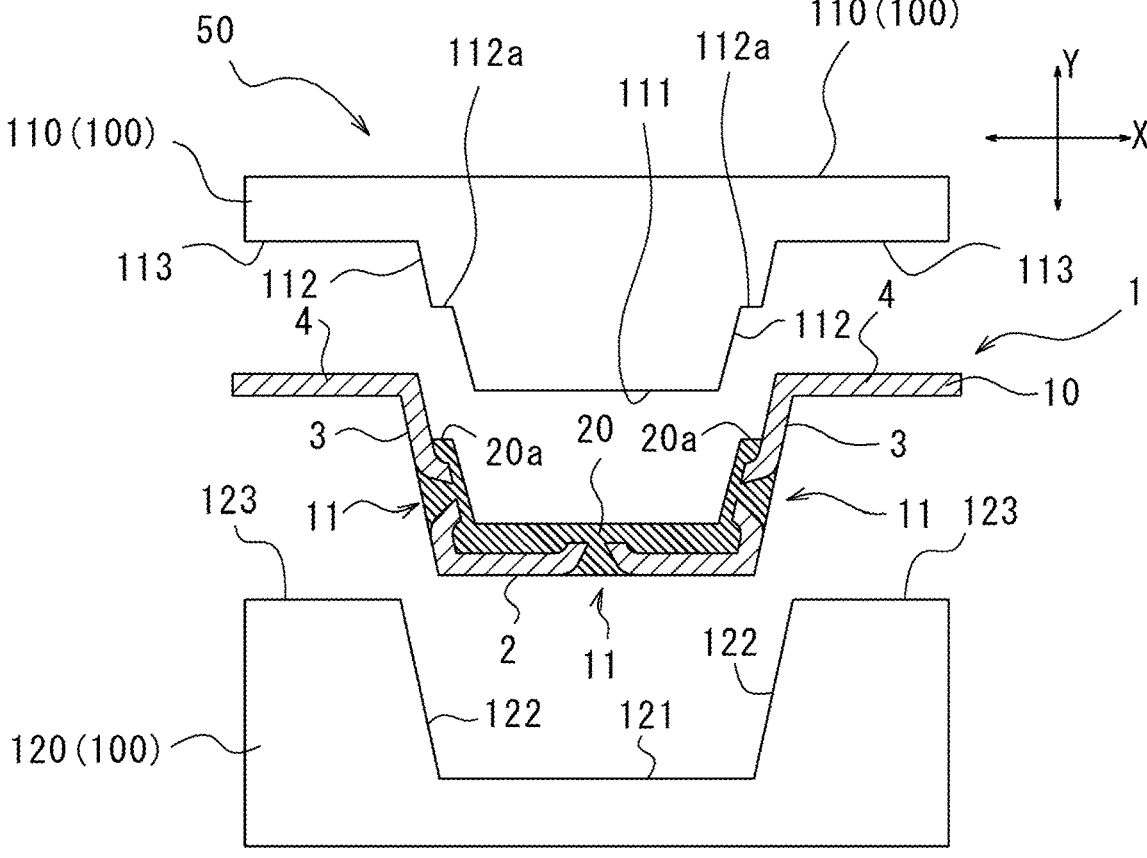
FIG. 8 is a cross-sectional view showing a sixth step of the method for manufacturing the metal-resin composite according to the first embodiment.

Referring to FIGS. 6 to 8, the mold 100 is used for the above second round of pressing. The mold 100 is for manufacturing the metal-resin composite 1 by integrating the metal plate 10 and the resin material 20 by warm-press molding. The mold 100 includes an upper mold 110 and a lower mold 120 that sandwich the metal plate 10 and the resin material 20. In the present embodiment, the upper mold 110 is configured as a punch, and the lower mold 120 is configured as a die. The upper mold 110 is movable in the vertical direction by the drive unit 101, that is, is configured to be capable of approaching and separating from the lower mold 120. However, a drive mode of the mold 100 by the drive unit 101 is not particularly limited, and the drive unit 101 may move at least one of the upper mold 110 and the lower mold 120 in the vertical direction.

The upper mold 110 has a first molding upper surface 111 for molding the bottom wall portion 2 (see FIGS. 1 and 2), a second molding upper surface 112 for molding the side wall portion 3 (see FIGS. 1 and 2), and a third molding upper surface 113 for molding the flange portion 4 (see FIGS. 1 and 2). In the present embodiment, the first molding upper surface 111 and the third molding upper surface 113 are configured as horizontal planes, and the second molding upper surface 112 is configured to connect the first molding upper surface 111 and the third molding upper surface 113 and to be inclined from the vertical direction.

In the present embodiment, the second molding upper surface 112 is provided with a step 112a. The step 112a is provided so as to rise from the first molding upper surface 111 toward the third molding upper surface 113 by one step.

The lower mold 120 has a first molding lower surface 121 for molding the bottom wall portion 2 (see FIGS. 1 and 2), a second molding lower surface 122 for molding the side wall portion 3 (see FIGS. 1 and 2), and a third molding lower surface 123 for molding the flange portion 4 (see FIGS. 1 and 2). In the present embodiment, the first molding lower surface 121 and the third molding lower surface 123 are configured as horizontal planes, and the second molding lower surface 122 is configured to connect the first molding lower surface 121 and the third molding lower surface 123 and to be inclined from the vertical direction. The first molding lower surface 121 is disposed to face the first molding upper surface 111, the second molding lower surface 122 is disposed to face the second molding upper surface 112, and the third molding lower surface 123 is disposed to face the third molding upper surface 113.

In a state where the upper mold 110 and the lower mold 120 are closed, a distance d1 between the first molding upper surface 111 and the first molding lower surface 121 is larger than a burring height H of the cut-and-raised portion 11 of the metal plate 10 (d1>H). A distance d3 between the third molding upper surface 113 and the third molding lower surface 123 is substantially equal to the thickness t of the metal plate 10 (d3=t). A distance d21 between the second molding upper surface 112 and the second molding lower surface 122 below the step 112a is larger than the burring height H of the cut-and-raised portion 11 of the metal plate 10 (d21>H), and a distance d22 between the second molding upper surface 112 and the second molding lower surface 122 above the step 112a is substantially equal to the thickness t of the metal plate 10 (d22=t).

A series of steps (see FIGS. 3 to 8) executed by the apparatus 50 having the above configuration will be sequentially described.

In the first step shown in FIG. 3, the flat plate-shaped metal plate 10 before molding is placed on the lower mold 93. In the present step and the next step, molding of the metal plate 10 is executed as cold pressing. However, molding of the metal plate 10 may be executed as warm pressing.

In the second step shown in FIG. 4, the upper mold 92 is lowered, and the metal plate 10 is sandwiched between the upper mold 92 and the lower mold 93 and press-molded into a hat shape (first round of pressing). It should be noted that in the present step, the resin material 20 (see FIGS. 6 to 8) is not yet filled, and only the metal plate 10 is sandwiched between the upper mold 92 and the lower mold 93.

In the third step shown in FIG. 5, the metal plate 10 molded in a hat shape is removed from the mold 90, and the machining machine 130 is set. In the present step, cut-and-raise machining including burring is performed by the machining machine 130. That is, the hole forming machine 131 forms the cutout hole 12 in the metal plate 10, and the raising machine 132 applies burring to the edge portion of the cutout hole 12 to form the cut-and-raised piece 13. In the present embodiment, the shapes of all the cutout holes 12 and the cut-and-raised pieces 13 are the same. However, the shapes of the cutout hole 12 and the cut-and-raised piece 13 may be partially changed.

In the fourth step shown in FIG. 6, for the second round of pressing, a sheet-shaped resin material 20 (also referred to as prepreg) cut into necessary dimensions is placed on the metal plate 10 subjected to the cut-and-raise machining. In the present embodiment, the thermosetting resin material 20 is cured at a high temperature and a high pressure by a molding method referred to as sheet molding compound (SMC) method (see also a fifth step described below). In addition, in the present embodiment, as the resin material 20, a fiber-reinforced plastic (FRP) in which a reinforcement fiber such as a glass fiber or a carbon fiber is impregnated into a resin is used. It should be noted that in the present step, the resin material 20 is not yet heated, that is, not cured. It should be noted that the resin material 20 does not need to have a sheet shape, and may have any shape.

In the fifth step shown in FIG. 7, the upper mold 110 is lowered, and the metal plate 10 and the resin material 20 are sandwiched between the upper mold 110 and the lower mold 120 to be integrated. In the present embodiment, the cavity C is formed as a space below the step 112a formed by being sandwiched between the upper mold 110 and the lower mold 120 (specifically, the metal plate 10). The resin material 20 is heated in a state of being filled in the cavity C and is cured without leaking from the cavity C. At this time, the resin material 20 abuts on the step 112a at the end surface 20a, and buries the cut-and-raised portion 11.

In the sixth step shown in FIG. 8, the upper mold 110 is raised. The resin material 20 is fastened to the upper surface (a hat-shaped recessed surface) of the metal plate 10, and the metal-resin composite 1 is formed. It should be noted that the resin material 20 is not fastened to the lower surface of the metal plate 10.

The cut-and-raised portion 11 will be described in detail with reference to FIGS. 9 to 13. In FIGS. 9 to 13, only the metal plate 10 is shown, and illustration of the resin material 20 is omitted.

Figure 9:
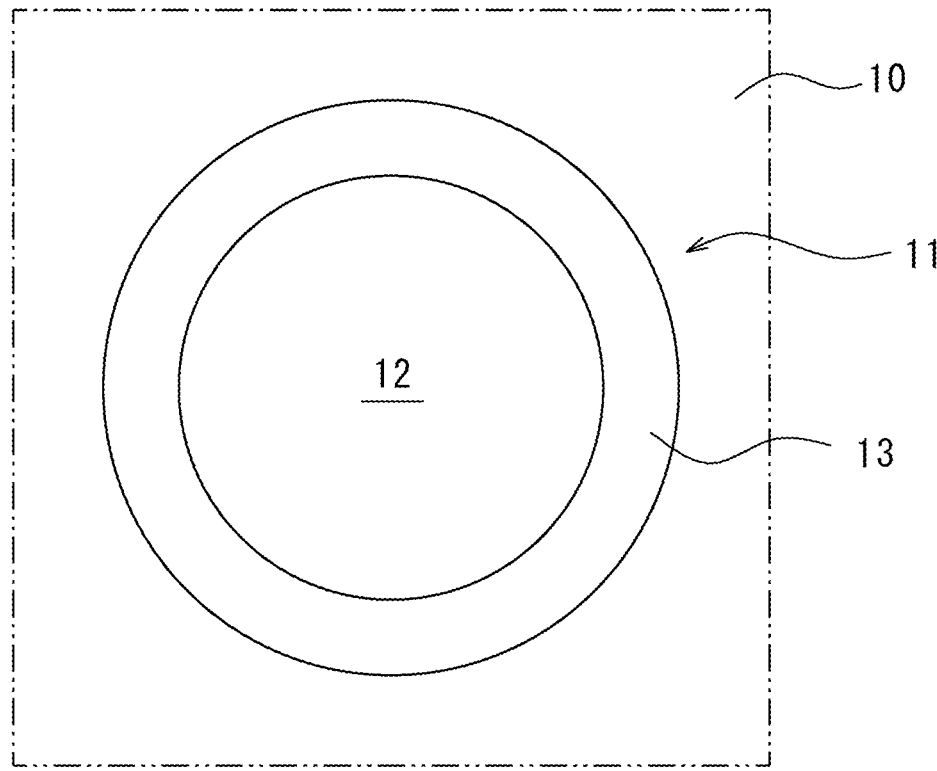
FIG. 9 is a plan view showing a cut-and-raised portion in the first embodiment.

The cut-and-raised portion 11 in the present embodiment shown in FIG. 9 has a cutout hole 12 and a cylindrical cut-and-raised piece 13 in which an edge portion of the cutout hole 12 is raised by burring. The cut-and-raised piece 13 has a tapered shape toward the tip.

Figure 10:
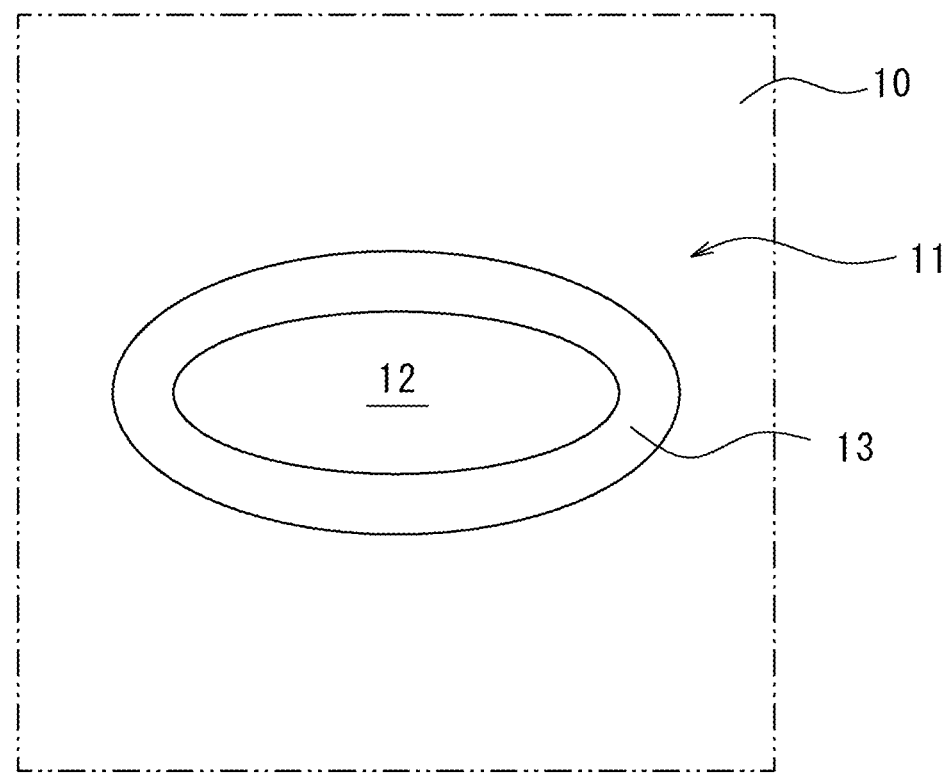
FIG. 10 is a plan view showing a first modification of the cut-and-raised portion in the first embodiment.

A first modification of the cut-and-raised portion 11 shown in FIG. 10 includes an elliptic cutout hole 12 and an elliptic tubular cut-and-raised piece 13 in which an edge portion of the cutout hole 12 is raised by burring. The cut-and-raised piece 13 has a tapered shape toward the tip.

Figure 11:
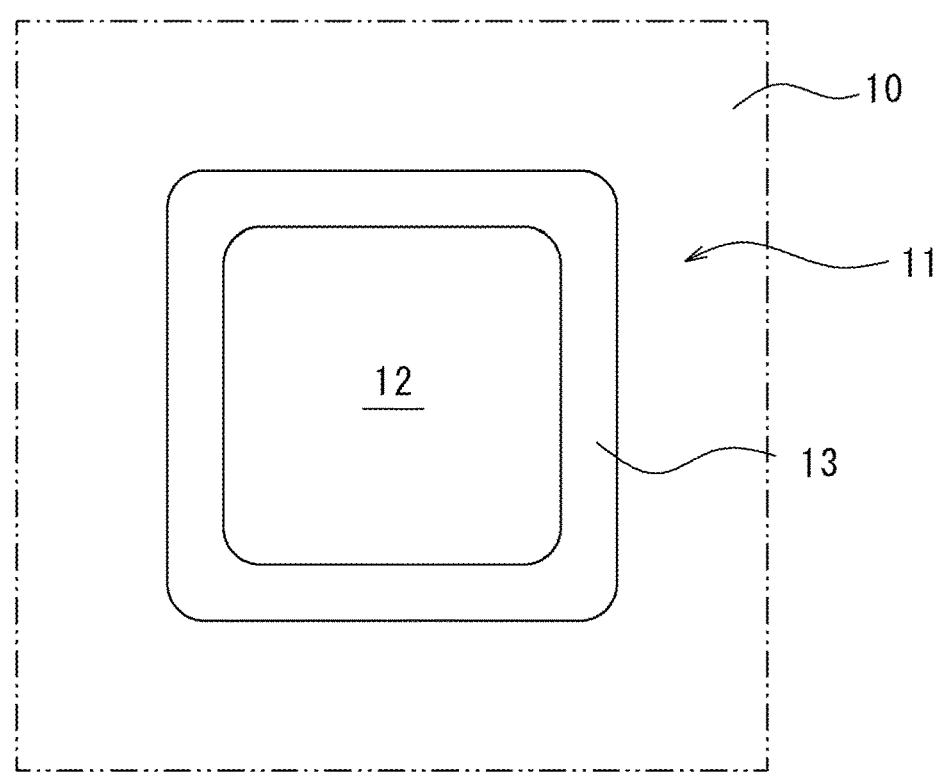
FIG. 11 is a plan view showing a second modification of the cut-and-raised portion in the first embodiment.

A second modification of the cut-and-raised portion 11 shown in FIG. 11 includes a corner-rounded quadrangular cutout hole 12 and a quadrangular tubular cut-and-raised piece 13 in which an edge portion of the cutout hole 12 is raised by burring. The cut-and-raised piece 13 has a tapered shape toward the tip.

Figure 12:
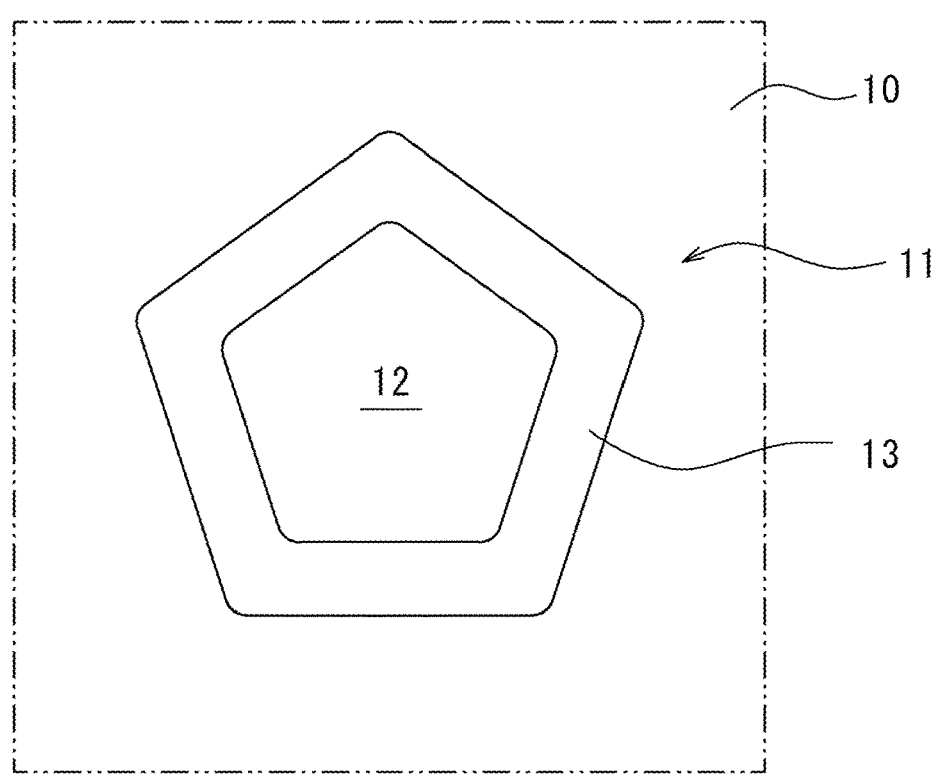
FIG. 12 is a plan view showing a third modification of the cut-and-raised portion in the first embodiment.

A third modification of the cut-and-raised portion 11 shown in FIG. 12 includes a corner-rounded pentagonal cutout hole 12 and a pentagonal tubular cut-and-raised piece 13 in which an edge portion of the cutout hole 12 is raised by burring. The cut-and-raised piece 13 has a tapered shape toward the tip.

FIGS. 11 and 12 show the cutout holes 12 having quadrangular and pentagonal shapes as examples of polygonal shapes, but the cutout hole 12 may have any other polygonal shape such as a triangular or a hexagonal shape.

Figure 13:
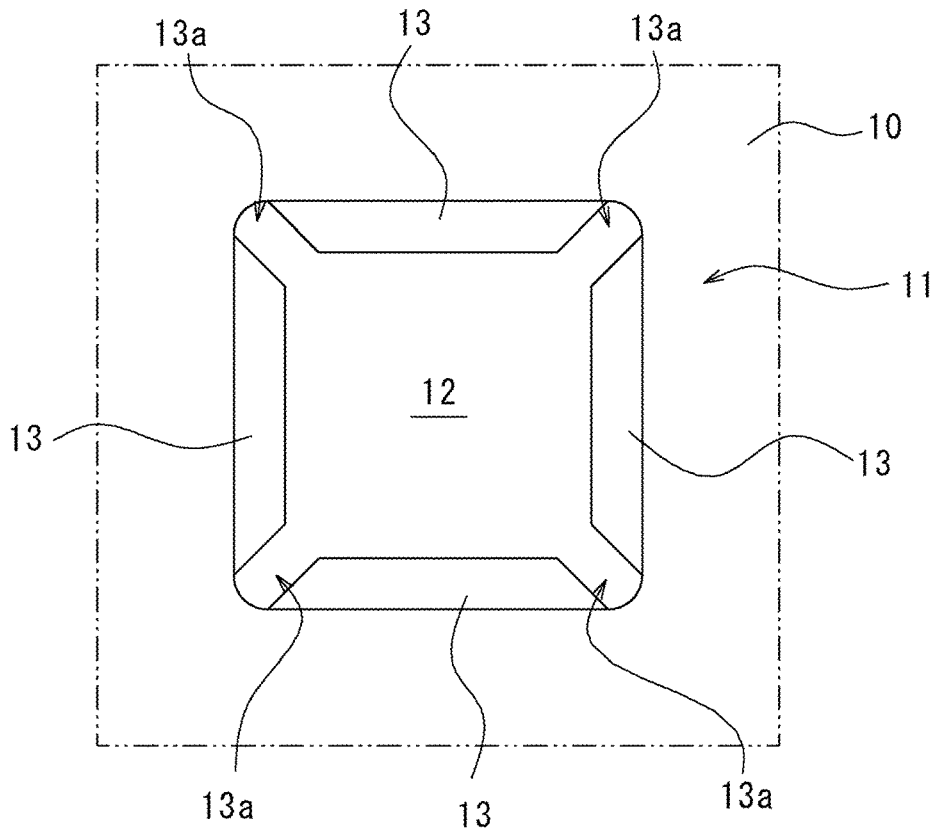
FIG. 13 is a plan view showing a fourth modification of the cut-and-raised portion in the first embodiment.

In a fourth modification of the cut-and-raised portion 11 shown in FIG. 13, cutouts 13a are provided at four corners of the cut-and-raised piece 13 of the second modification of the cut-and-raised portion 11 shown in FIG. 11. That is, the cut-and-raised piece 13 is divided into four.

Figure 14:
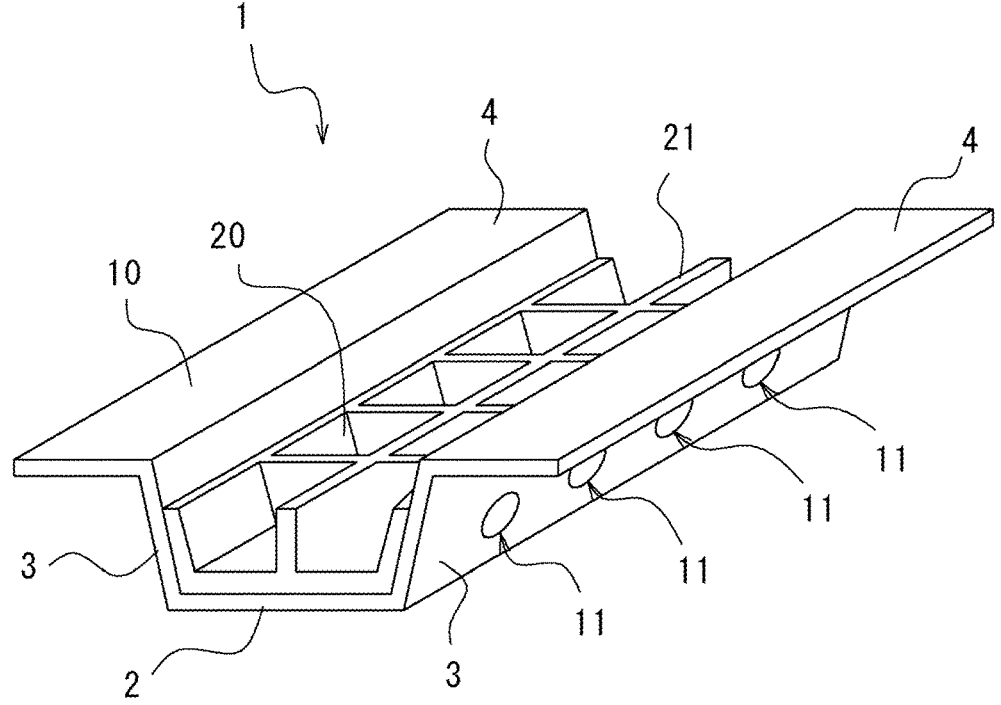
FIG. 14 is a perspective view showing a modification of the resin material in the first embodiment.

In addition, referring to FIG. 14, the shape of the resin material 20 does not need to have the same thickness as shown in FIG. 1. That is, the resin material 20 may have a beam-shaped portion 21 protruding like a beam. In the illustrated example, the beam-shaped portion 21 has a lattice shape in a plan view, and protrudes upward from the bottom wall portion 2 and extends in the horizontal direction to connect the side wall portions 3 and 3. It should be noted that the upper mold 110 has a recessed shape complementary to the shape of the beam-shaped portion 21.

According to the present embodiment and modifications, the following action and effect are produced.

Since the cut-and-raised portion 11 is buried in the resin material 20, the resin material 20 is less likely to be peeled off from the metal plate 10, and high joint strength regarding integration can be secured. In addition, since the resin material 20 is disposed on only one surface side of the metal plate 10, the number of layers of the resin material 20 can be reduced from two to one as compared with the case where the resin material 20 is disposed on both surface sides. Therefore, not only the structure can be simplified, but also the thickness of the resin material 20 can be reduced. Therefore, the thickness of the metal plate 10 can be prevented from becoming small due to the restriction of the cross-sectional dimension, and high rigidity of the metal-resin composite 1 can be secured. Therefore, in the metal-resin composite 1, it is possible to achieve both high joint strength and high rigidity of the metal-resin composite with a simple structure.

In addition, the cut-and-raised piece 13 can be formed by burring that is very simple as machining.

In addition, since the cut-and-raised piece 13 has a tapered shape, the resin material 20 entering the tapered shape is less likely to come off, and higher joint strength can be exhibited. In addition, since the cut-and-raised piece 13 has a closed cross-sectional structure, it is possible to exert a strong drag against a force in any shearing direction (a direction parallel to one surface of the metal plate 10) and to secure higher joint strength.

In addition, by burying the plurality of cut-and-raised portions 11 in the resin material 20, it is possible to secure higher joint strength and to prevent the resin material 20 from rotating on one surface of the metal plate 10. In particular, regarding the latter, similar action and effect are produced even when the cutout hole 12 is formed in a polygonal shape or an elliptic shape.

Second Embodiment

Figure 15:
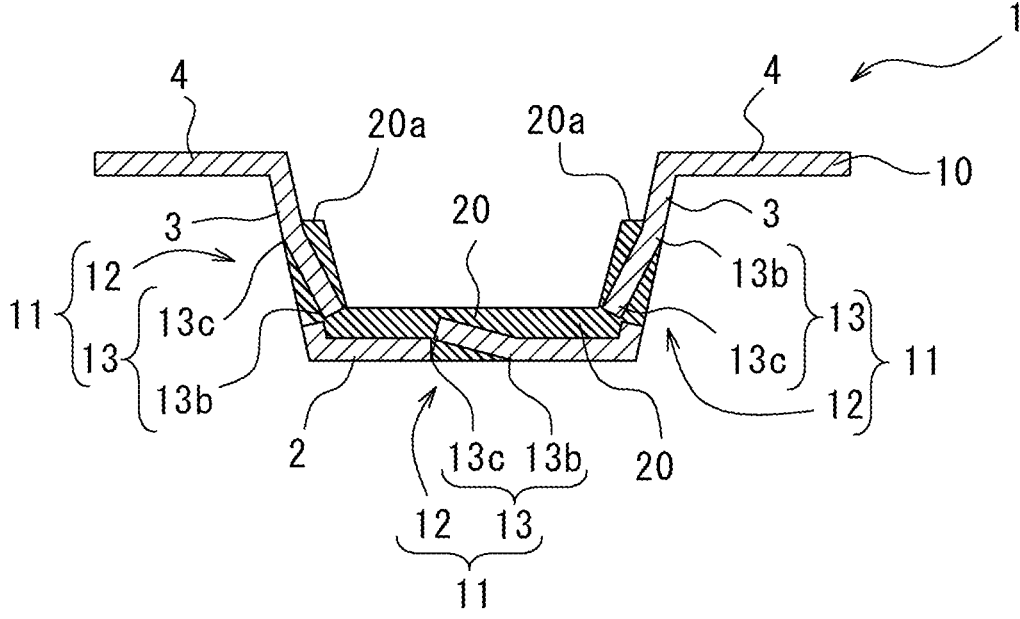
FIG. 15 is a cross-sectional view perpendicular to the longitudinal direction of a metal-resin composite according to a second embodiment.
Figure 16:
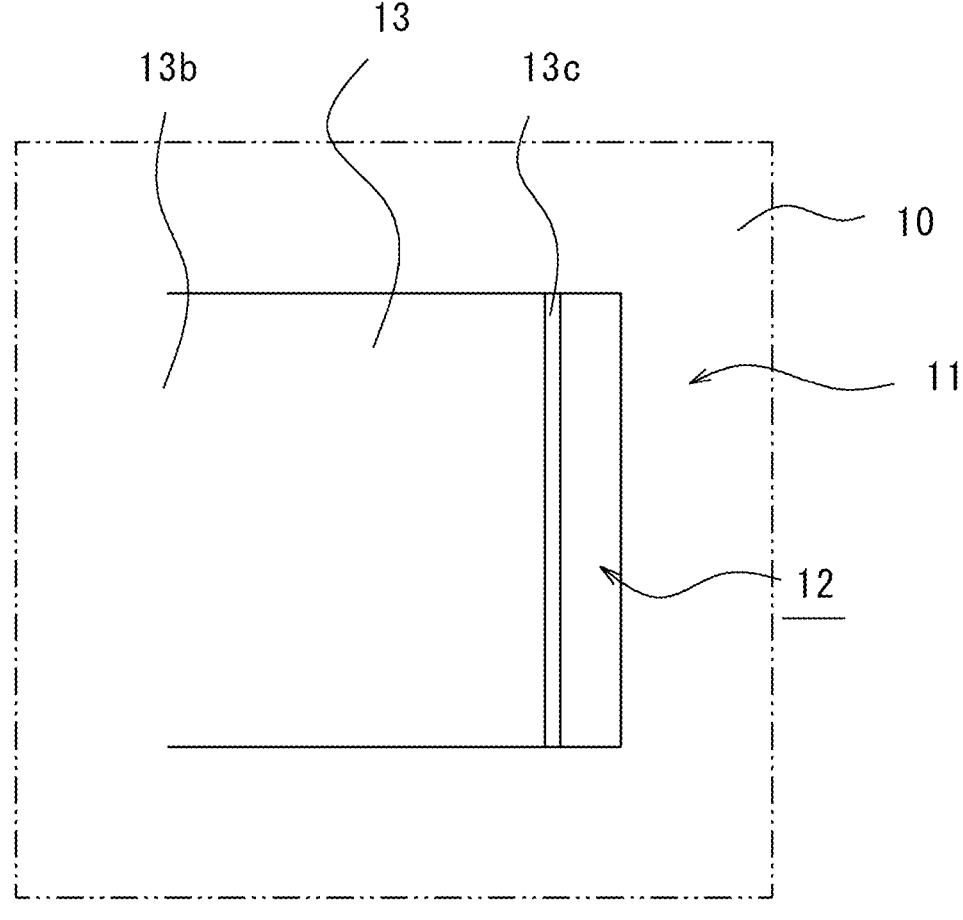
FIG. 16 is a plan view showing a cut-and-raised portion in the second embodiment.

A metal-resin composite 1 and a method and an apparatus 50 for manufacturing the same according to a second embodiment will be described with reference to FIGS. 15 and 16. In the present embodiment, the shape of the cut-and-raised portion 11 of the metal-resin composite 1 is different from that of the first embodiment. The configuration is substantially the same as the configuration of the first embodiment except for the configuration related thereto. Therefore, description of the portions shown in the first embodiment may be omitted.

In the present embodiment, the cutout hole 12 has a polygonal shape (rectangular shape in the illustrated example). The cut-and-raised piece 13 has a polygonal shape (rectangular shape in the illustrated example) having a shape complementary to the shape of the cutout hole 12. The cut-and-raised piece 13 has a base end 13*b* connected to one side of an edge portion of the cutout hole 12 and a distal end 13*c* which is a free end opposite to the base end 13*b*.

In the present embodiment, when the cut-and-raised portion 11 is formed, a cut is made in a U shape in the metal plate 10, and the cutout hole 12 and the cut-and-raised piece 13 are formed by raising the portion where the cut is made. Therefore, the machining machine 130 also has a corresponding structure.

According to the present embodiment, a strong drag is exerted against the shearing force in the direction from the distal end 13*c* to the base end 13*b* of the cut-and-raised piece 13 in order that the resin material 20 does not come off. Therefore, the joint strength against the shearing force in the direction can be selectively increased. In addition, since the cutout hole 12 and the cut-and-raised piece 13 have complementary shapes, the cut-and-raised portion 11 can be configured only by making a cut in the metal plate 10 and raising the cut portion. Therefore, it is not necessary to completely cut the metal plate 10 in forming the cut-and-raised portion 11. Therefore, not only a cut end material does not come out, but also reduction in rigidity can be suppressed to a certain extent.

Third Embodiment

Figure 17:
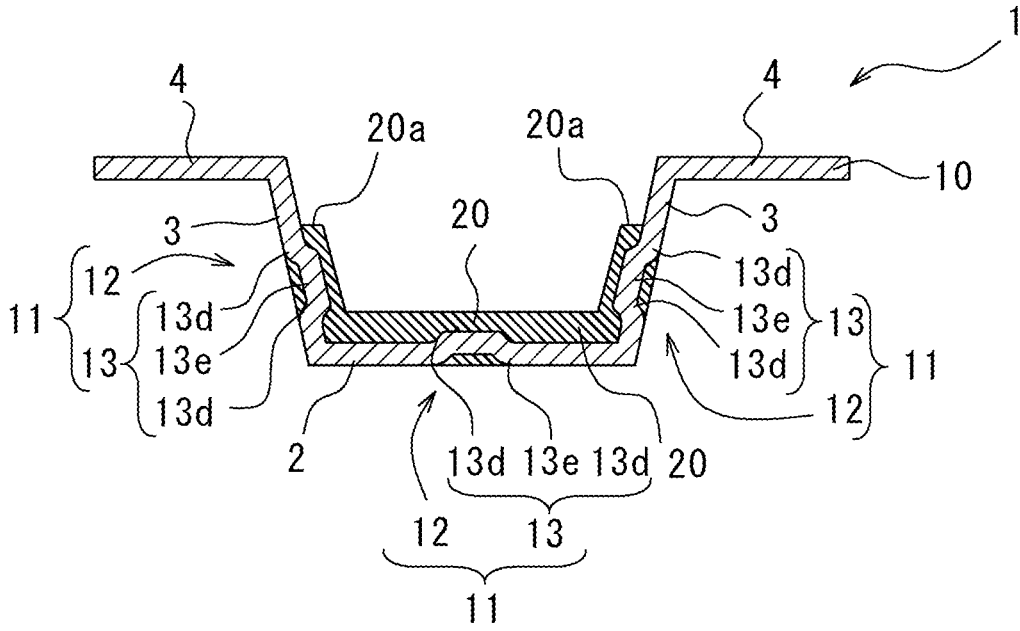
FIG. 17 is a cross-sectional view perpendicular to the longitudinal direction of a metal-resin composite according to a third embodiment.
Figure 18:
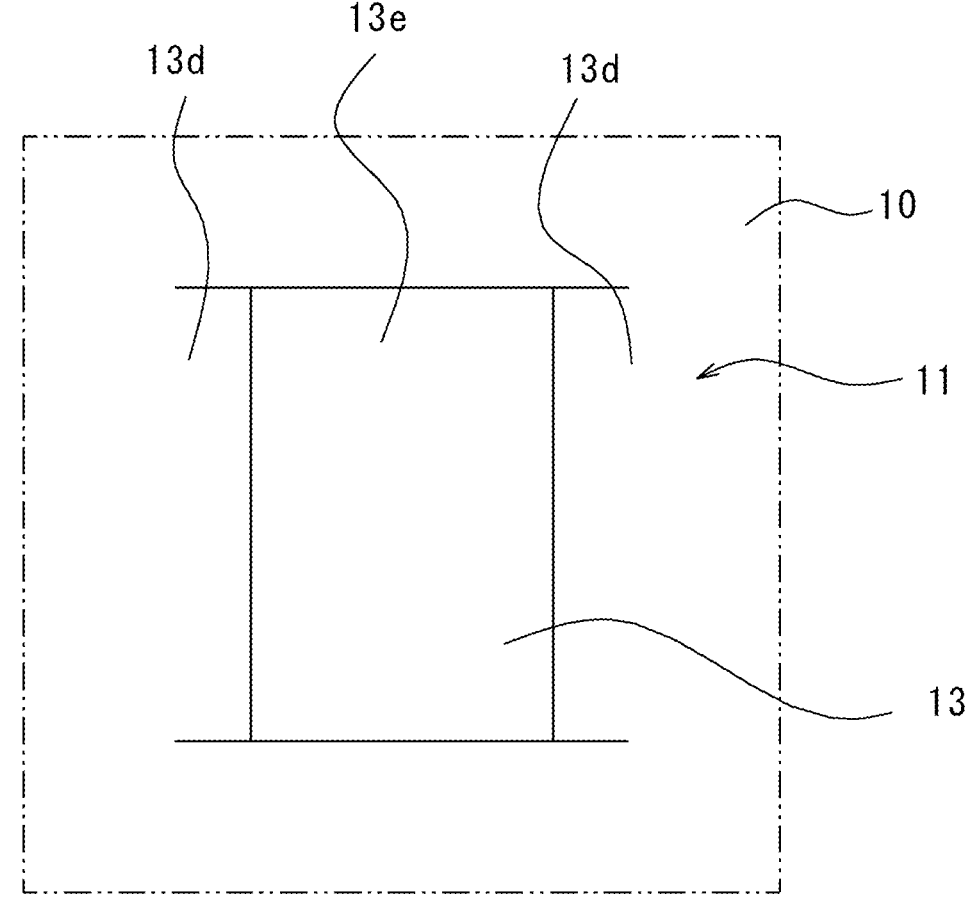
FIG. 18 is a plan view showing a cut-and-raised portion in the third embodiment.

A metal-resin composite 1 and a method and an apparatus 50 for manufacturing the same according to a third embodiment will be described with reference to FIGS. 17 and 18. In the present embodiment, the shape of the cut-and-raised portion 11 of the metal-resin composite 1 is different from that of the first embodiment. The configuration is substantially the same as the configuration of the first embodiment except for the configuration related thereto. Therefore, description of the portions shown in the first embodiment may be omitted.

In the present embodiment, the cutout hole 12 has a polygonal shape (rectangular shape in the illustrated example) having two opposing sides. The cut-and-raised piece 13 has a polygonal shape (rectangular shape in the illustrated example) having a shape complementary to the shape of the cutout hole 12. The cut-and-raised piece 13 has two base ends 13*d* connected to two opposing sides of an edge portion of the cutout hole 12, and a central portion 13*e* raised from the two base ends 13*d*.

In the present embodiment, when the cut-and-raised portion 11 is formed, a cut is made in two parallel-line shape in the metal plate 10, and the cutout hole 12 and the cut-and-raised piece 13 are formed by raising the portion where the cut is made. Therefore, the machining machine 130 also has a corresponding structure.

According to the present embodiment, a tunnel structure is formed on one surface of the metal plate 10 by the cut-and-raised piece 13. Therefore, the resin material 20 entering the tunnel structure is less likely to come off, and higher joint strength can be exhibited.

As described above, although the specific embodiments and their modifications of the present invention are described, the present invention is not limited to the above-described embodiments, and can be implemented with various modifications within the scope of the present invention. For example, an appropriate combination of contents of the individual embodiments and modifications may be one embodiment of the present invention.

In addition, as the resin material 20, a thermoplastic resin impregnated with reinforcement fibers such as glass fibers or carbon fibers may be used. In this case, the resin material 20 is put into the mold 100 in a state of being heated and softened. Then, the metal-resin composite 1 is manufactured by cooling and curing the resin material 20 on the metal plate 10 in the mold 100.

In addition, in the metal-resin composite 1, an adhesive layer may be provided between the metal plate 10 and the resin material 20. In this case, by providing the adhesive layer, the metal plate 10 and the resin material 20 can be firmly integrally molded.

The invention claimed is:

1. A metal-resin composite comprising:
   a metal plate including a plurality of cut-and-raised portions, each of the plurality of cut-and-raised portions including a cutout hole and a cut-and-raised piece, the cut-and-raised piece being raised from an edge of the cutout hole, so that a plurality of cutout holes are formed in the metal plate; and one resin material disposed only on one surface side of the metal plate but not disposed on a lower surface of the metal plate, the resin material cured by burying all of the plurality of cut-and-raised portions, the resin material integrated with the metal plate, wherein the cut-and-raised piece of each of the plurality of cut-and-raised portions is cut-and-raised only on the one surface of the metal plate, the lower surface of the metal plate is flat, and the one resin material covers only a portion on the one surface side of the metal plate.

2. The metal-resin composite according to claim 1, wherein the cut-and-raised piece is configured by an edge portion of the cutout hole being raised by burring.

3. The metal-resin composite according to claim 2, wherein the cut-and-raised piece has a tapered shape.

4. The metal-resin composite according to claim 3, wherein the cutout hole has a polygonal shape or an elliptic shape.

5. The metal-resin composite according to claim 1, wherein the cutout hole has a polygonal shape, and wherein the cut-and-raised piece has a polygonal shape having a shape complementary to a shape of the cutout hole, and has a base end connected to one side of an edge portion of the cutout hole and a distal end being a free end opposite to the base end.

6. The metal-resin composite according to claim 1, wherein the cutout hole has a polygonal shape having two opposing sides, and wherein the cut-and-raised piece has a polygonal shape having a shape complementary to a shape of the cutout hole, and has two base ends connected to two sides of an edge portion of the cutout hole, and a central portion raised from the two base ends.

7. The metal-resin composite according to claim 3, wherein the metal plate has a hat shape in a cross section perpendicular to a longitudinal direction, and wherein the plurality of cut-and-raised portions are provided on a flat surface of the metal plate, and wherein the metal plate has a concave portion and the resin material covers only a portion but not an entire surface of the concave portion of the metal plate.

8. The metal-resin composite according to claim 2, wherein the cutout hole has a polygonal shape or an elliptic shape.

9. The metal-resin composite according to claim 2, wherein the metal plate has a hat shape in a cross section perpendicular to a longitudinal direction, and wherein the plurality of cut-and-raised portions are provided on a flat surface of the metal plate, and wherein the metal plate has a concave portion and the resin material covers only a portion but not an entire surface of the concave portion of the metal plate.

10. The metal-resin composite according to claim 1, wherein the metal plate has a hat shape in a cross section perpendicular to a longitudinal direction, and wherein the plurality of cut-and-raised portions are provided on a flat surface of the metal plate, and wherein the metal plate has a concave portion and the resin material covers only a portion but not an entire surface of the concave portion of the metal plate.

11. The metal-resin composite according to claim 1, wherein the metal plate has at least two sides that meet to form an angle, and each of the two sides includes at least one of the plurality of cut-and-raised portions.

\* \* \* \* \*